United States Patent
Ricco et al.

(10) Patent No.: US 6,609,500 B2
(45) Date of Patent: Aug. 26, 2003

(54) DEVICE FOR CONTROLLING THE FLOW OF A HIGH-PRESSURE PUMP IN A COMMON-RAIL FUEL INJECTION SYSTEM OF AN INTERNAL COMBUSTION ENGINE

(75) Inventors: Mario Ricco, Casamassima (IT); Stefano Maria Borrione, Turin (IT)

(73) Assignee: C.F.R. Societa Consortile per Azioni, Orbassano (IT)

(*) Notice: Subject to any disclaimer, the term of this patent is extended or adjusted under 35 U.S.C. 154(b) by 0 days.

(21) Appl. No.: 09/969,422

(22) Filed: Oct. 2, 2001

(65) Prior Publication Data

US 2002/0088437 A1 Jul. 11, 2002

(30) Foreign Application Priority Data

Oct. 3, 2000 (IT) ..................... TO2000A0918

(51) Int. Cl.[7] .............................................. F02M 37/04
(52) U.S. Cl. ...................................... 123/446; 123/497
(58) Field of Search ................................ 123/446, 497, 123/456, 506, 514

(56) References Cited

U.S. PATENT DOCUMENTS

| | | | | |
|---|---|---|---|---|
| 4,459,959 A | * | 7/1984 | Terada et al. | 123/446 |
| 4,884,545 A | * | 12/1989 | Mathis | 123/447 |
| 6,058,912 A | * | 5/2000 | Rembold et al. | 123/516 |
| 6,119,655 A | * | 9/2000 | Heinitz et al. | 123/447 |
| 6,227,167 B1 | * | 5/2001 | Smith et al. | 123/446 |
| 6,253,734 B1 | * | 7/2001 | Rembold et al. | 123/446 |
| 6,293,253 B1 | * | 9/2001 | Arnold et al. | 123/458 |
| 6,345,605 B1 | * | 2/2002 | Augustin et al. | 123/446 |
| 6,367,454 B1 | * | 4/2002 | Rembold et al. | 123/497 |

FOREIGN PATENT DOCUMENTS

| | | | |
|---|---|---|---|
| DE | 19618932 | 11/1997 | F02M/63/00 |
| DE | 19652831 | 6/1998 | F04B/49/035 |
| DE | 19859175 | 6/2000 | F02M/55/00 |
| DE | 19548278 | 11/2000 | F02M/63/04 |

* cited by examiner

Primary Examiner—Carl S. Miller
(74) Attorney, Agent, or Firm—Conley Rose, P.C.

(57) ABSTRACT

The common rail supplies a number of injectors of the cylinders of the engine, and is supplied by a constant-displacement high-pressure pump in turn supplied by a low-pressure, variable-delivery, variable-pressure, motor-driven pump. The control device has an electronic control unit for receiving signals indicating operating conditions of the engine; the suction side of the high-pressure pump has a choke; and the control unit controls the motor-driven pump to vary the fuel pressure upstream from the choke between a predetermined maximum value and a predetermined minimum value, so as to regulate the fuel intake of the high-pressure pump within a predetermined range.

13 Claims, 2 Drawing Sheets

DEVICE FOR CONTROLLING THE FLOW OF A HIGH-PRESSURE PUMP IN A COMMON-RAIL FUEL INJECTION SYSTEM OF AN INTERNAL COMBUSTION ENGINE

CROSS-REFERENCE TO RELATED APPLICATIONS

This application claims priority of Italian Application No. TO2000A 000918 filed Oct. 3, 2000 hereby incorporated herein by reference.

The present invention relates to a device for controlling the flow of a high-pressure pump in a common-rail fuel injection system of an internal combustion engine, wherein the high-pressure pump is a constant-displacement type supplied with fuel by a low-pressure, variable-delivery, variable-pressure pump.

BACKGROUND OF THE INVENTION

As is known, in modern internal combustion engines, each injector is supplied with high-pressure fuel by a common header or so-called "common rail", which is supplied by a high-pressure, normally piston, pump in turn supplied with fuel from the fuel tank by a low-pressure pump.

The low-pressure pump normally supplies fuel at a pressure of around a few bars, while the fuel in the rail may reach pressures in the region of 1500 bars. The high-pressure pump is normally operated by the internal combustion engine drive shaft via a drive belt or similar (gears), whereas the low-pressure pump is operated by a direct-current electric motor or equivalent (brushless motors) of its own, and so defines a motor-drive pump.

On account of the varying operating load of the internal combustion engine, the two pumps must be designed to guarantee the necessary fuel supply to the injectors in the worst possible conditions—i.e. with the engine at full load and/or high speed with fuel leakage—and with any external temperature and any fuel temperature in the tank. The surplus fuel supplied by each pump is fed back into the tank via respective pressure control valves and drain conduits.

The high-pressure pump therefore draws the maximum amount of energy at all times, which must be supplied by the internal combustion engine. Moreover, due to heating of the fuel by the heat dissipated as a result of the difference of pressure across the pressure regulating valve of the pump, the fuel drained into the tank tends to heat the fuel to be pumped, which therefore becomes more fluid, thus increasing fuel leakage, e.g. between the pistons and cylinders, and so reducing the volumetric efficiency of the pump.

Various types of devices are known for controlling the flow of common-rail injection system high-pressure pumps. In one known type, flow is regulated by varying the piston, e.g. suction, stroke to vary displacement of the pump mechanically. The mechanisms by which the stroke is varied, however, are highly complex and expensive to produce; and, during the compression stroke, the reduction in the suction stroke of the pistons causes the drive cam to strike the pistons, thus resulting in frequent malfunctioning or damage to the pump.

Devices are also known for controlling the flow of constant-displacement high-pressure pumps, and which provide for regulating the fuel supply to the pump. In one known type, this is done by means of a regulating valve fitted to the delivery side of the low-pressure pump to adjust the fuel flow section.

Known control devices of this sort have the drawback of being expensive to produce and unreliable; and both the diaphragms and the valve involve additional expense in terms of both manufacture and in-service checks. Moreover, particularly at idling engine speed, such devices fail to ensure equal fuel supply to all the high-pressure pump pistons, thus resulting in unbalanced operation and rapid wear of the pump.

SUMMARY OF THE INVENTION

It is an object of the present invention to provide a device for controlling the flow of a high-pressure pump, which is straightforward in design, cheap to produce, ensures a high degree of efficiency and reliability, and provides for eliminating the aforementioned drawbacks typically associated with known devices.

According to the present invention, there is provided a device for controlling the flow of a high-pressure pump in a common-rail fuel injection system of an internal combustion engine, wherein said high-pressure pump is a constant-displacement type and is supplied with fuel by a low-pressure, variable-delivery, variable-pressure pump; characterized by comprising a choke on the suction side of said high-pressure pump; and means for controlling said low-pressure pump to vary the fuel pressure upstream from said choke between a maximum predetermined value and a minimum predetermined value, so as to regulate fuel intake by said high-pressure pump within a predetermined range.

More specifically, said low-pressure pump is a motor-driven pump, and said means comprise an electronic control unit for receiving signals indicating the operating conditions of the engine; said control unit controlling said motor-driven pump as a function of said signals.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
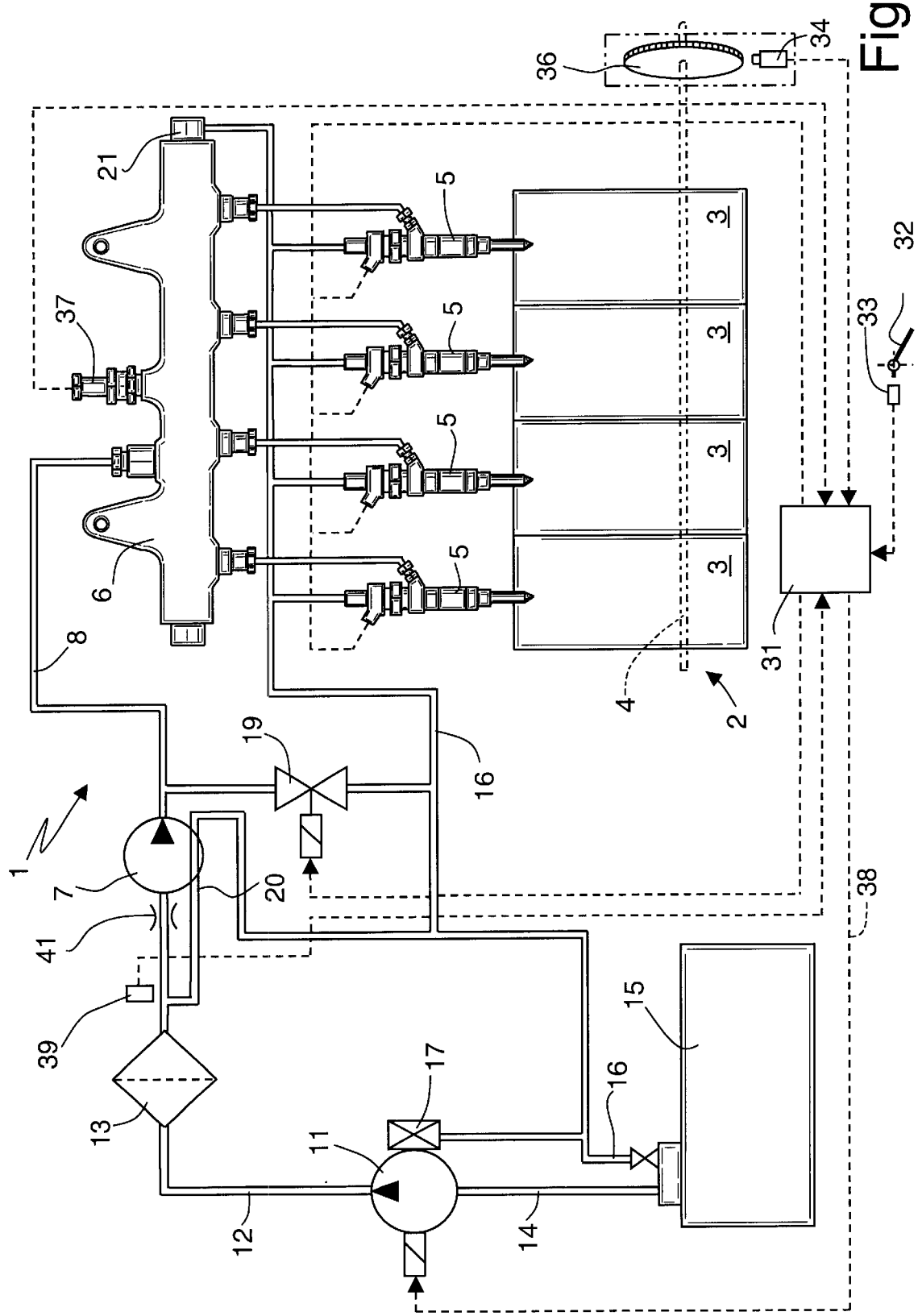
FIG. 1 shows a diagram of a common-rail injection system featuring a high-pressure pump flow control device in accordance with a preferred embodiment of the present invention.

Referring initially to FIG. 1, a common-rail injection system 1 comprises an internal combustion, e.g. diesel, engine 2 comprising a number of cylinders 3 and a drive shaft 4. Injection system 1 further comprises a number of electromagnetic injectors 5 associated with, and for, injecting high-pressure fuel into cylinders 3.

Injectors 5 are connected to a vessel 6 defining the common rail, which is supplied along a delivery conduit 8 with high-pressure fuel by a mechanical, constant-displacement, high-pressure pump 7. High-pressure pump 7 is, in turn, supplied by a low-pressure pump 11, driven by a direct-current electric motor and, hereafter referred to as a motor-driven pump. A delivery conduit 12 of motor-driven pump 11 and a fuel filter 13 are located between motor-driven pump 11 and high-pressure pump 7.

Motor-driven pump 11 is connected to a fuel tank 15 by a conduit 14. Motor-driven pump 11 is preferably immersed in the fuel inside tank 15, in which a drain conduit 16 terminates to drain off the surplus fuel discharged by motor-driven pump 11 through an overpressure valve 17.

By means of lubricating conduits 20, part of the fuel in delivery conduit 12 lubricates the mechanisms of high-pressure pump 7 and is drained into drain conduit 16. A pressure regulator 19, controlled as described later on, is provided between delivery conduit 8 and drain conduit 16 to drain any surplus fuel into drain conduit 16. Drain conduit 16 drains the surplus fuel of injectors 5 and, via a pressure-limiting safety valve 21, any surplus fuel accumulated in vessel 6 in the event of failure of the pressure control system.

Figure 2:
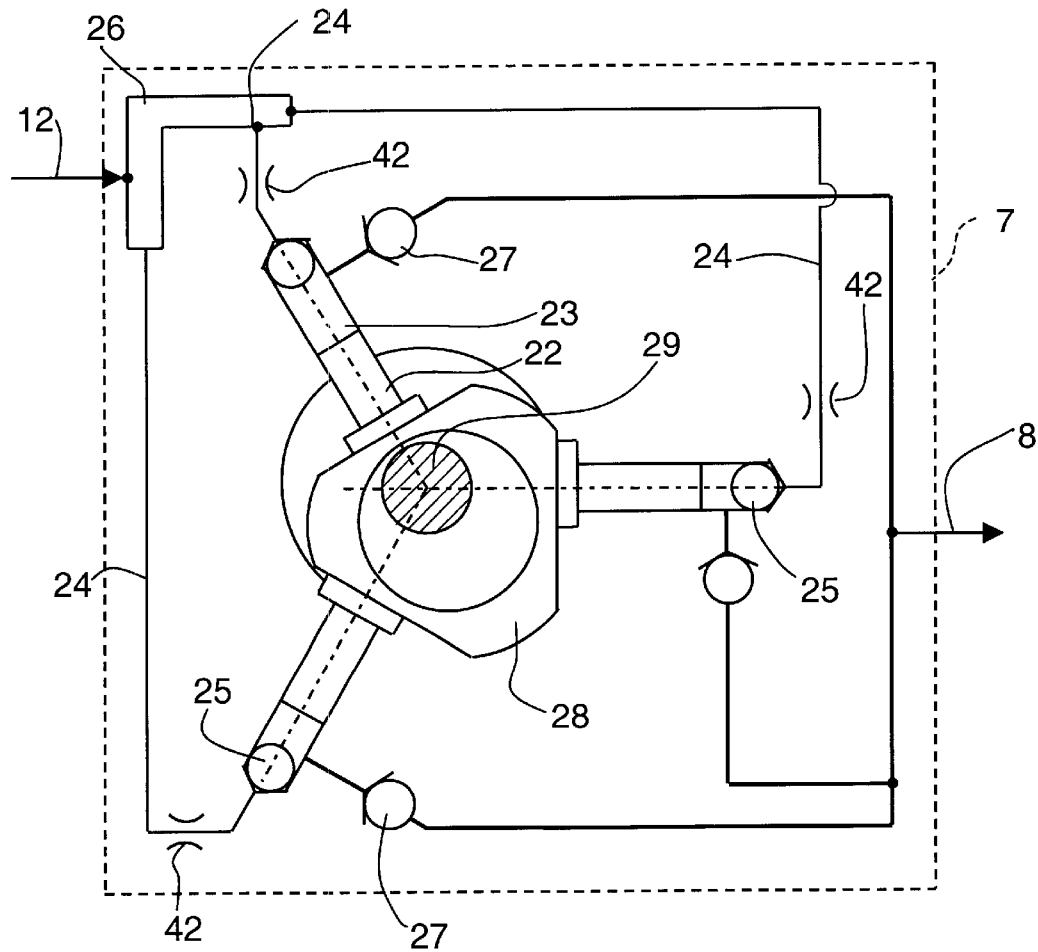
FIG. 2 shows a diagram of an injection system high-pressure pump in accordance with a preferred embodiment of the present invention.

Referring now to FIG. 2, high-pressure pump 7 comprises a number of pumping elements, each defined by a piston 22 moving back and forth inside a respective cylinder 23. For example, pump 7 may be a known type with three radial cylinders 23, each communicating, via a respective intake conduit 24 and a respective nonreturn valve 25, with a distributor 26 communicating with delivery conduit 12 of motor-driven pump 11, and normally defined by an annular groove between two parts of the body of pump 7.

Each cylinder 23 has a delivery valve 27 by which it feeds high-pressure fuel to delivery conduit 8 and vessel 6. Pistons 22 are operated by a cam 28 fitted to a shaft 29, which is rotated by drive shaft 4 in known manner by means of transmission and/or reduction gears or the like (i.e. belts).

The fuel in tank 15 is at atmospheric pressure. Motor-driven pump 11 preferably compresses the fuel to a low pressure, e.g. of about 2–5 bars, and high-pressure pump 7 compresses the fuel to bring the fuel in vessel 6 to a pressure of about 1500 bars.

Injectors 5 are controlled by an electronic control unit 31, which may be defined by a known central microprocessor control unit, such as that used in controlling engine 2. Control unit 31 receives signals indicating the operating conditions of engine 2 (i.e. the position of accelerator pedal 32 detected by a sensor 33; the speed of engine 2 detected by a sensor 34 of a sound wheel 36 on drive shaft 4; the pressure of the fuel in vessel 6, as detected by a pressure sensor 37; etc.) and, by processing the incoming signals according to a given program, controls the instant, and for how long individual injectors 5 are operated, as well as pressure regulator 19.

According to a preferred embodiment of the present invention, the control device comprises a choke 41 on the suction side of high-pressure pump 7 and means for controlling motor-driven pump 11. Means for controlling motor-driven pump 11 regulates the fuel pressure upstream from choke 41 between a maximum and a minimum predetermined value, so as to regulate fuel intake by high-pressure pump 7 within a predetermined range.

More specifically, choke 41 is located on delivery conduit 12, at the intake of high-pressure pump 7, but downstream from the branch point of lubricating conduits 20. The means for controlling motor-driven pump 11 comprise control unit 31, which, as a function of the aforementioned signals, controls the pressure of the fuel supplied by motor-driven pump 11, so as to regulate fuel flow along conduit 12 to high-pressure pump 7. High-pressure pump 7 thus operates in the same way as a variable-delivery pump, with no overpressure and substantially no surplus fuel being drained into tank 15.

The pressure of the fuel supplied by motor-driven pump 11 is regulated to maintain a substantially constant fuel pressure at the intake of high-pressure pump 7. For which purpose, control unit 31 supplies motor-driven pump 11, over a line 38, with a signal for controlling the supply current of the electric motor, and so directly regulating the pressure of the fuel supplied to high-pressure pump 7.

Alternatively, control unit 31 may supply motor-driven pump 11 with a signal for controlling the supply voltage of motor-driven pump 11, and so regulating fuel flow to high-pressure pump 7 and, therefore, pressure upstream from choke 41.

Since the flow of high-pressure pump 7 during operation of engine 2 must be regulated within a wide range, e.g. from 1 to 10, low-pressure motor-driven pump 11 must also be regulated accordingly. To reduce the adjustment range of motor-driven pump 11, a maximum predetermined fuel flow to high-pressure pump 7, and a minimum fuel flow, equal to a predetermined fraction of maximum flow, have been established. Preferably, the maximum fuel flow is advantageously set in the region of 80 liters/hour, and the minimum fuel flow equal to one-half the maximum value, i.e. about 40 liters/hour.

Moreover, on the suction side of high-pressure pump 7, upstream from or inside the pump, a choke 41 is provided, which is designed to require an increase in pressure upstream from choke 41 itself to vary fuel flow to high-pressure pump 7. More specifically, choke 41 may be located on delivery conduit 12 of motor-driven pump 11, between filter 13 and high-pressure pump 7.

Figure 3:
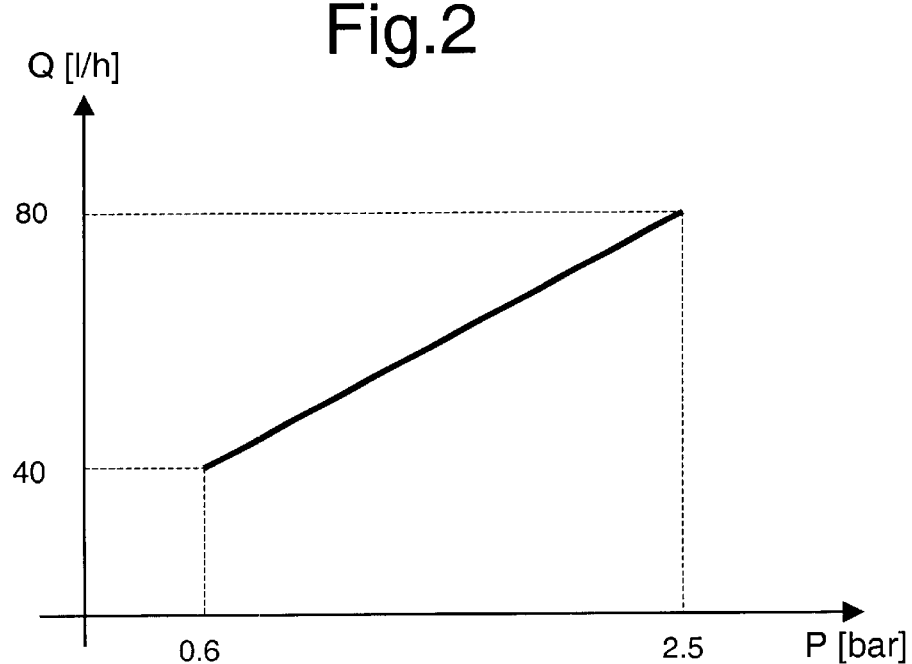
FIG. 3 shows a graph of the variation in flow of a low-pressure pump in accordance with a preferred embodiment of the present invention.

Alongside a variation in flow within the aforementioned range, the absolute pressure upstream from choke 41 has been found to vary in direct proportion to flow, as shown in FIG. 3. More specifically, the absolute fuel supply pressure ranges between a maximum value, when fuel flow is maximum, and a minimum value when fuel flow is minimum. Precise testing shows the diameter of choke 41 can be so selected as to require an absolute pressure of 2.5 bars for 80 liter/hour fuel flow, and an absolute pressure of 0.6 bar for minimum 40 liter/hour fuel flow.

The absolute pressure of the fuel in conduit 12 is determined by a pressure sensor 39 fitted to conduit 12 upstream from choke 41 and monitored by control unit 31, so that motor-driven pump 11 may be simply feedback-controlled by unit 31.

On the basis of the above flow and corresponding absolute pressure values, both calculation and known tests show that the intake pressure of the high-pressure pump can be maintained within a region of a few bars (2–3) using conduit 12 having a 3 mm or greater diameter, and choke 41 having roughly a 0.9 mm diameter.

Referring now to FIG. 2, in the case of a high-pressure pump 7 comprising three cylinders 23, fuel supply to the individual cylinders 23 may be unbalanced when only a small amount of fuel is required. In some embodiments of the invention, conduit 24 of each cylinder is provided with a choke 42 to ensure even supply of each cylinder 23 at constant supply pressure by varying fuel flow by varying the delivery pressure of motor-driven pump 11.

The advantages of the control device according to the present invention will be clear from the aforementioned description. In particular, flow of the high-pressure pump is varied by modifying the low-pressure pump, with minimal additional mechanisms required, and by regulating the power supply of the low-pressure pump electric motor. Moreover, the adjustment range of motor-driven pump 11 is reduced by choke 41 or chokes 42.

Clearly, changes may be made to the control device as described herein without, however, departing from the scope of the accompanying claims. For example, the injection system control device may be governed by an electronic control unit separate from the central unit controlling the engine, the pressure regulator of the high-pressure pump may be dispensed with, and the high-pressure pump may be a different type from the one shown in FIG. 2.

What is claimed is:

1. A device for controlling the flow of a high-pressure pump in a common-rail fuel injection system of an internal combustion engine, wherein said high-pressure pump is a constant-displacement type and is supplied with fuel by a low-pressure, variable-delivery, variable-pressure motor-driven pump, the device comprising:

a choke on the suction side of said high-pressure pump; and means for controlling said low-pressure pump to vary fuel pressure upstream from said choke between a maximum predetermined value and a minimum predetermined value, so as to regulate fuel intake by said high-pressure pump within a predetermined range, said means comprising an electronic control unit for receiving signals indicating the operating conditions of the engine and unit controlling said motor-driven pump as a function of said signals;

wherein said control unit receives signals indicating the fuel pressure upstream from said choke and feedback-controls said motor-driven pump.

2. A device as claimed in claim 1, wherein said control unit controls the supply current of said motor-driven pump to directly vary the fuel pressure upstream from said choke.

3. A device as claimed in claim 1, wherein said control unit controls the supply voltage of said motor-driven pump to vary fuel flow to said choke, and so vary the fuel pressure upstream from said choke.

4. A device as claimed in claim 3, wherein said control unit controls said motor-driven pump between a predetermined maximum flow and a predetermined minimum flow by varying the pressure upstream from said choke between said maximum value, when said flow is the predetermined maximum, and said minimum value, when said flow is the predetermined minimum.

5. A device as claimed in claim 1, wherein said choke is located upstream from said high-pressure pump or inside said high-pressure pump.

6. A device as claimed in claim 5, wherein a delivery conduit of said motor-driven pump is located between said motor-driven pump and said high-pressure pump and wherein said choke is located on said delivery conduit.

7. A device as claimed in claim 5, wherein said high-pressure pump has a number of pumping elements, and comprises a number of intake conduits of said pumping elements communicating with a delivery conduit of said motor-driven pump, and wherein said choke is located on each of said intake conduits.

8. A device as claimed in claim 4, wherein said minimum flow is equal to a fraction of said maximum flow.

9. A device as claimed in claim 4, wherein said minimum flow is equal to one-half said maximum flow.

10. A device as claimed in claim 4, wherein said fuel flow in said delivery conduit ranges between 40 and 80 liters/hour.

11. A device as claimed in claim 4, wherein the variation in fuel flow in said delivery conduit is substantially proportional to the variation in pressure upstream from said choke.

12. A device as claimed in claim 10, wherein said maximum pressure value upstream from said choke is about 2.5 bars, and said minimum pressure value is about 0.6 bar.

13. A device as claimed in claim 10, wherein the diameter of said choke is about 0.9 mm.

* * * * *

UNITED STATES PATENT AND TRADEMARK OFFICE
CERTIFICATE OF CORRECTION

PATENT NO. : 6,609,500 B2
DATED : August 26, 2003
INVENTOR(S) : Mario Ricco and Stefano Maria Borrione It is certified that error appears in the above-identified patent and that said Letters Patent is hereby corrected as shown below:

<u>Title page,</u>
Item [73], Assignee, should read -- C.R.F. Societa Consortile per Azioni, Orbassano (IT) --
Item [30], Foreign Application Priority Data, should read as follows:
-- Oct. 3, 2000 (IT)     TO2000A000918 --

Signed and Sealed this

Sixteenth Day of December, 2003

JAMES E. ROGAN
*Director of the United States Patent and Trademark Office*